July 16, 1929.  C. H. MANEVAL  1,721,159
VEHICLE GUARD
Original Filed April 13, 1926  3 Sheets-Sheet 1
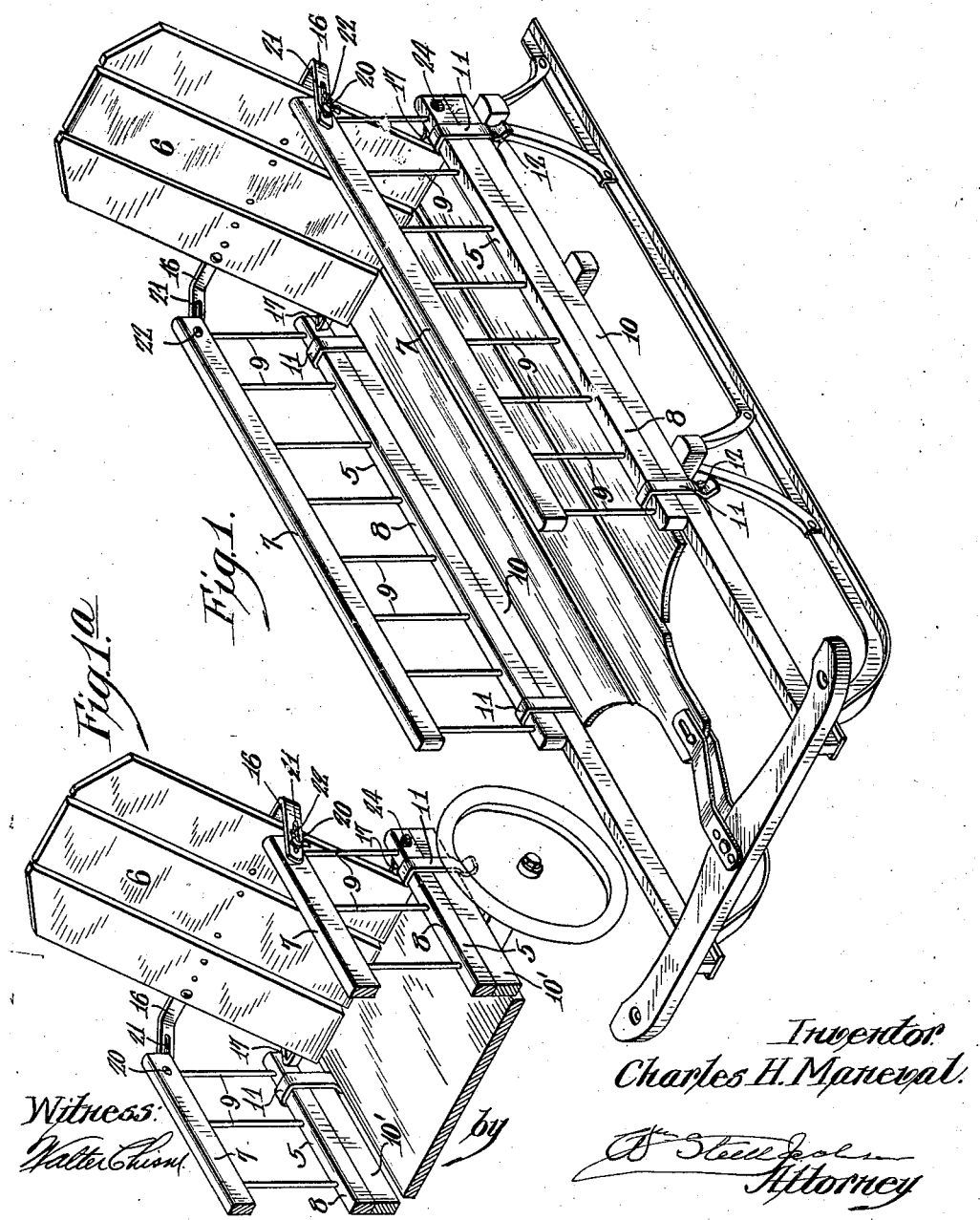

July 16, 1929.  C. H. MANEVAL  1,721,159
VEHICLE GUARD
Original Filed April 13, 1926   3 Sheets-Sheet 2
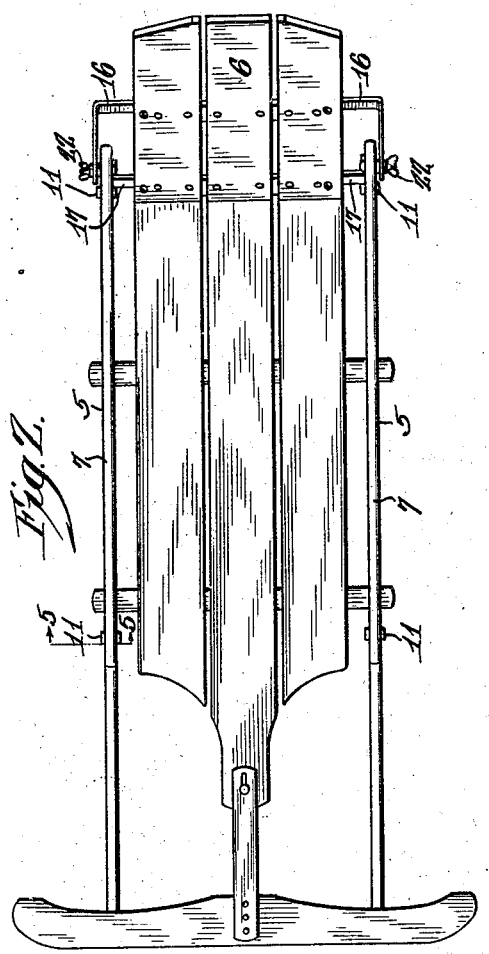
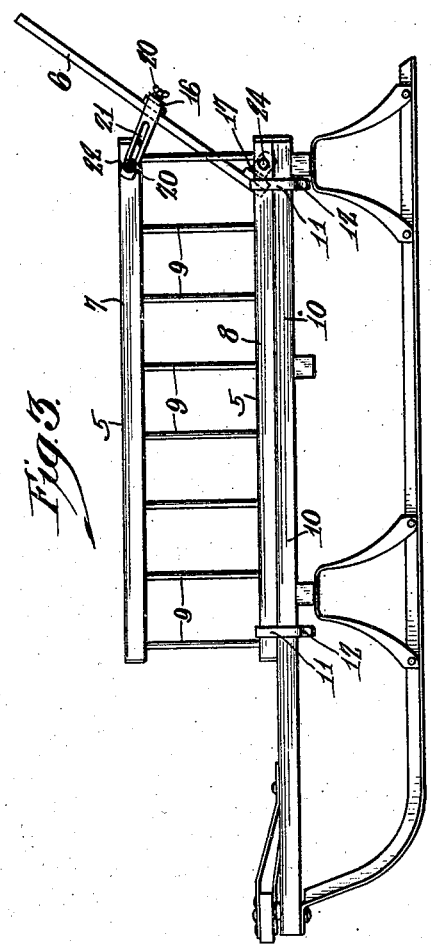

July 16, 1929. C. H. MANEVAL 1,721,159
VEHICLE GUARD
Original Filed April 13, 1926   3 Sheets-Sheet 3
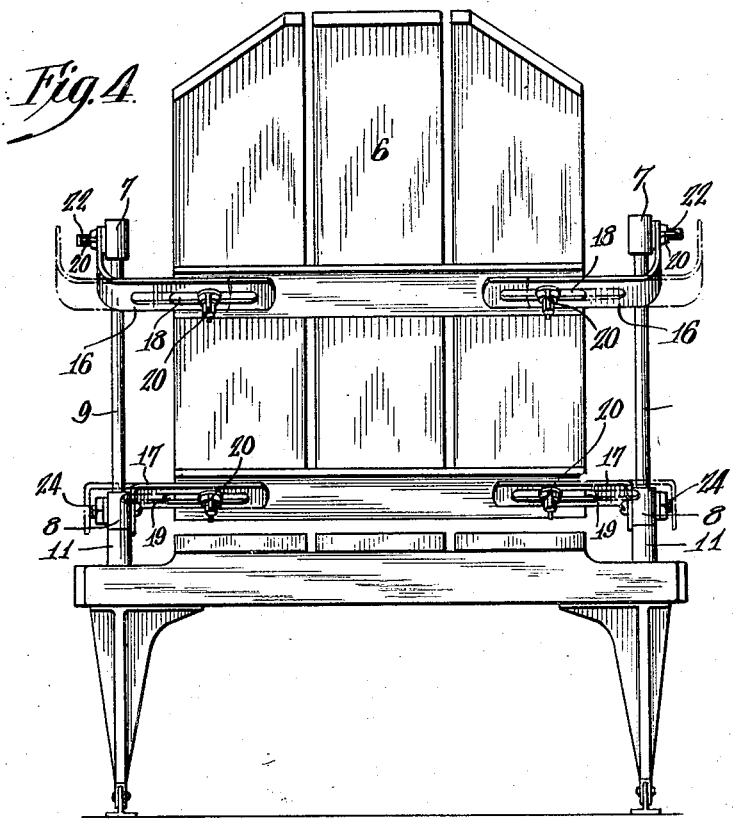
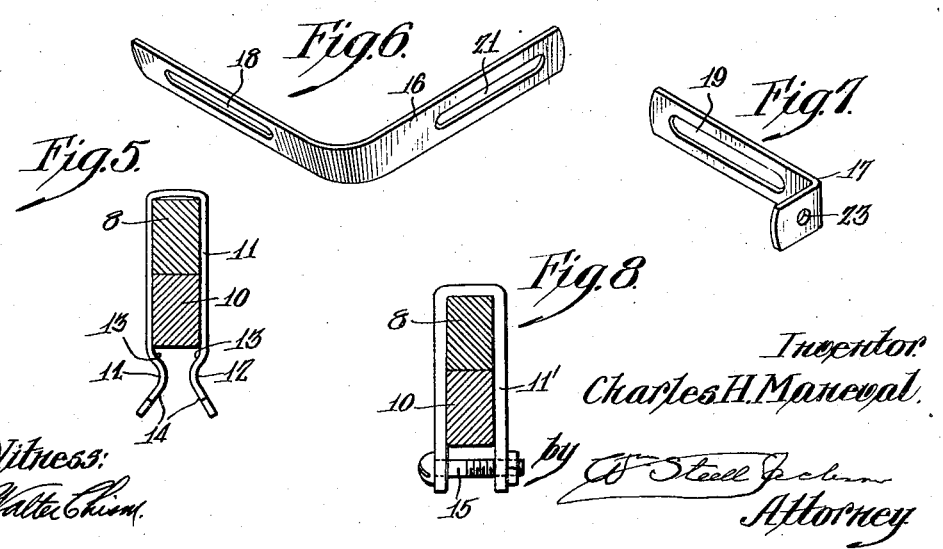

Patented July 16, 1929.

1,721,159

UNITED STATES PATENT OFFICE.

CHARLES HERBERT MANEVAL, OF DUNCANNON, PENNSYLVANIA, ASSIGNOR TO STANDARD NOVELTY WORKS, OF DUNCANNON, PENNSYLVANIA, A CORPORATION OF PENNSYLVANIA.

VEHICLE GUARD.

Application filed April 13, 1926, Serial No. 101,692. Renewed March 19, 1927.

My invention relates to attachments for sleds and children's wagons for the purpose of protecting young children in the use of them.

The purpose of my invention is to supply a guard attachment adapted for quick assembly upon and removal from a sled or wagon and which shall be adjustable to differing widths of sled or wagon top and provide adjustable slopes of back for the guard.

Further purposes will appear in the specification and in the claims.

I prefer to illustrate my invention by one main form only, among a number which might be used, selecting a form which I have found to be practical, efficient and inexpensive and which at the same time well illustrates the principles of my invention.

Figure 1 is a perspective of the preferred form of my invention attached to a sled.

Figure 1$^a$ is a framentary perspective showing attachment of the invention to a wagon.

Figures 2, 3 and 4 are a top plan view and side and rear elevations, respectively, of the structure seen in Figure 1.

Figure 5 is an enlarged fragmentary section of Figure 2 taken upon lines 5—5.

Figures 6 and 7 are perspectives of preferred fastening devices used by me.

Figure 8 is a fragmentary section corresponding to Figure 5 but showing a slightly different fastening.

In the drawings similar numerals indicate like parts.

My guard comprises side frames 5 and back 6 with suitable attaching devices for holding the side frames to the sled or wagon and for holding the back in place and supporting the side frames by it. It will be noted that the side frames and back mutually support each other.

The side frames as shown comprise upper and lower bars 7 and 8 joined by rods 9. The lower bars 8 are fastened to the side rails or strips 10 or 10' of the sled or wagon by any suitable fastenings of which I have shown two, a spring clip 11 in Figure 5 and a strap 11' in Figure 8.

The spring clip is pinched inwardly at 12 to provide inner and outer sloping surfaces 13 and 14, making it easy to apply and remove the clip by sliding motion longitudinally of the clip.

The clip 11' is tightened in place by bolt 15. In either event the later engagement of the inner and outer sides of rail 10 or 10' and bar 8 is sufficient to give considerable stiffness to the side frames.

At the rear, the side frames are held against separation by the back 6 through the brackets 16 and 17 which, when fastened in position, hold the side frames rigidly to the back at top and bottom. These brackets have arms 16', 17' extending transversely of the sled. The connections of these arms with the back are adjustable to accommodate extension or contraction of the side frames from or toward each other so as to fit different widths of vehicle. For this purpose the bracket arms are apertured, here shown as slotted at 18 and 19 so that bolts may pass through them and be held in adjustable positions by thumb nuts 20. The fastenings 16 are provided with other arms 16$^2$ which are apertured, here shown as slotted at 21 for bolts 22 whose thumb nuts tighten in adjusted positions so as to give different slopes to the back by tilting it. In order to permit this tilting of the back the fastenings 17 are secured to the inner faces instead of to the rear of the bars 8, being apertured at 23 to permit passage of pivot bolts 24 for this purpose.

The entire structure is adjustable to different widths of seat and slope of back and yet is rigid when in position. It is capable of being packed in small space when removed from the vehicle.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. A guard for a sled or wagon comprising side frames adapted for attachment to the vehicle, a back, pivotal connections between the back and the lower parts of the side frames adjustably connected with the back to allow spacing of side frames to different positions for use, and connections between the side frames and back at the upper part of the side frames, adjustable to accommodate said spacing.

2. In a guard for a sled or wagon, side frames having upper and lower side bars, a back adapted to be supported by the side frames and fittings fastened to and connecting the back and side frames, comprising at each side a lower pivotal member and an upper retaining and slope-adjusting member, the pivotal member apertured for adjustable attachment to the back and having an angular end cooperating with the lower rail to pivotally support the back, and the retaining member having an apertured portion for adjustable attachment to the back, and a slotted portion at an angle thereto for adjustable connection to the upper bar.

3. In a guard for a sled or wagon, side frames having upper and lower side bars, a back between the side bars, an angular pivotal member adapted to be pivoted at one end to one of the bars and apertured at the other end for engagement with the back for lateral adjustment to fit different widths of sled, a retaining member extending between the back and the other bar and apertured at one end for adjustment, and fastening means for the members.

4. A guard for a sled or wagon comprising side frames, each having side bars and a back adapted to be supported from these bars in combination with pivoting brackets for the lower part of the back, co-operating with the side frames at one end each to perform pivotal functions, and at the other ends having arms engaging and supporting the back and fitted for engagement with the back at different distances along these arms of the brackets, retaining members for the upper part of the back fitted for engagement to the side rails at different points for adjustment of the slope of the back and for attachment to the back at different positions of the members to adapt to different spacings of the side frames, and fastening devices for holding the brackets and retaining members to the back and for holding the retaining members to the side frames.

5. A guard for a sled or a wagon comprising side frames, each having side bars, and a back adapted to be supported from these bars in combination with bracket fittings on each side located respectively near the bottom and near the top of the side frames, the fittings near the bottom being pivotally connected to the side frames, the fittings near the top having apertured arms connected to the frames at different points along the length of the arms for different adjustments, and both having arms extending transversely of the sled and apertured for connection with the back selectively at different points to provide for different widths of spacing between the side bars.

CHARLES HERBERT MANEVAL.